March 12, 1968     R. W. WILLIAMS     3,372,655

BAKING APPARATUS

Filed July 22, 1966

United States Patent Office 3,372,655
Patented Mar. 12, 1968

3,372,655
BAKING APPARATUS
Robert W. Williams, Brookville Road,
Brookville, N.Y.
Filed July 22, 1966, Ser. No. 567,287
6 Claims. (Cl. 107—57)

ABSTRACT OF THE DISCLOSURE

This invention is concerned with the use of a continuous hold down conveyor having a slack bottom portion within a baking chamber to use the force of gravity to produce a continuous downward force on the lids of the baking pans during an initial period of the baking cycle.

---

This invention relates to an apparatus for baking bread and the like in covered baking pans.

In modern practice, bread is often baked in rectangular pans having three or more compartments to produce a rectangular bread loaf suitable for making sandwiches.

The pans have lids that are snap-locked onto the pan itself prior to placing the pans onto the moving hearth of the commercial oven.

It is a time consuming procedure to place the lids onto each of the pans and then to lock them in place.

Moreover, lids having snap-locks thereon are expensive to make.

Furthermore, after the bread is baked the pans are cooled in order to be handled again to unsnap the snap lock of each baking pan.

It is an object of this invention to provide a device whereby the use of individual locking of the separate bread pans is eliminated.

It is another object to provide bread pan having a simple rectangular overlapping cover.

It is a further object to provide a method of holding down the lid onto the pan during the initial part of the baking process.

These and other objects of this invention will become apparent upon reading the following descriptive disclosure of an illustrative embodiment shown in the accompanying drawing in which, FIG. 1 is a section view taken through the oven of this invention showing the manner of applying a continuous holddown chain conveyor to the lids of the baking pans during the initial part of the baking process.

Figure 1:
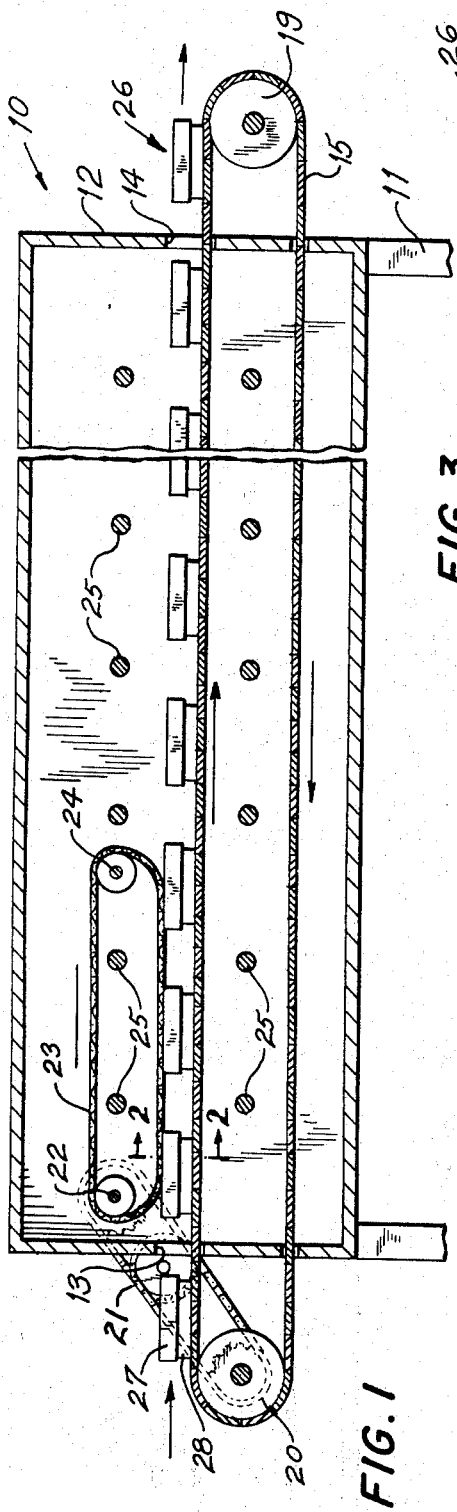
Figure 3:
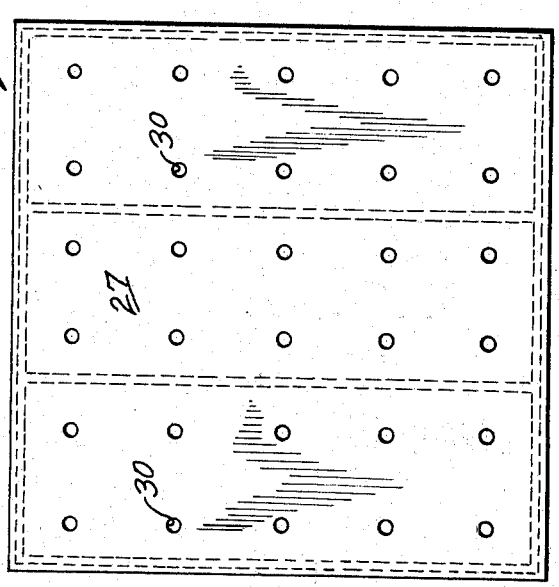
FIG. 3 is a top view of a baking pan showing the use of a simple overlapping lid having apertures therein to facilitate escape of moisture and air from the baking compartments.
Figure 2:
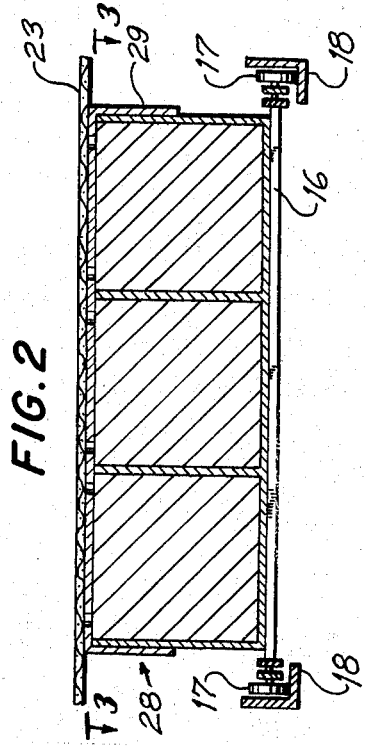
FIG. 2 is a section view taken on line 2—2 of FIG. 1.

In the making of sandwich type loaves of bread, a predetermined weighed amount of dough is uniformly placed in each compartment of a compartmented baking pan. Next, a cover or lid having a complicated snap lock thereon is fitted onto the pan and by manipulation of a lever action the lid is snap locked to the coacting pan. Then the locked pan is placed upon the moving conveyor of the oven for travel into the hearth baking area.

According to this invention a simple overlapping lid is placed upon the pan and then transferred onto the conveyor of the oven of this invention.

Turning to the drawing the baking oven 10 is provided with conventional supports 11. The oven itself is preferably a longitudinal rectangular chamber 12 having an inlet opening 13 at one end and outlet opening 14 at the other end.

A moving conveyor 15 or hearth floor is preferably made of slats 16 secured on each end to a link 17 of a continuous link chain which travels in a track 18.

The driver sprocket wheel 19 is located at the outlet end and is motivated by a conventional electric motor. The inlet end sprocket wheel 20 is provided with a gear and chain assembly 21 to motivate the drive sprocket wheel 22 of the wire or chain hold-down conveyor 23.

The driven sprocket wheel 24 of the hold-down conveyor is located about one-fifth of the oven length away from the inlet opening 13. In other words the length of the hold down chain conveyor fully located in the oven chamber 12 is about twenty percent of the oven length.

The oven chamber is supplied with heat by means of burners 25 which may be electrical ribbon burners or suitable gas burners or the like. The axis of the sprockets 22 and 24 are secured in the side walls of the chamber 12 as are also the tracks 18 of the conveyor 15.

The baking pans 26 of this invention may be three compartment rectangular pans 27 and a corresponding rectangular lid 28 having a peripheral depending ledge 29.

The lid 27 may be supplied with apertures 30 to permit escape of air from the pan during the baking process.

In the use of the baking pans of this invention the pans loaded with dough are placed on the conveyor 15 at the inlet side and are slowly moved into the oven chamber 12. As the pans with their lids move into the oven they engage the unsupported or slack weight of the bottom portion of the chain conveyor 23. The chain conveyor 23 moves at the same speed as the hearth conveyor 15 so that the applied or slack chain weight confines the rising bread to its rectangular compartment forcing it to assume the shape of the compartment. Clearly, the length of the bottom portion of conveyor 23 is longer than the top portion (FIG. 1) to produce the needed slack or excess length therein.

The pans with the weight of the chain conveyor 23 thereon travel about twenty percent or one-fifth of the oven length. Within this distance the dough rises and assumes its final confined rectangular shape. After leaving the chain conveyor 23 the pans travel under baking temperature of burners 25 to the exit opening 14.

At the opening 14 the lids 27 are removed and the bread is then removed from the pans.

The advantages of this invention are the ability to obtain the full expansion of the dough in the pans; the ability to obtain surplus bake on top of the loaves by burner heat conduction through the wire mesh; the elimination of all locking devices; full expansion of the loaves under the chain conveyor 23 until the action of the yeast is killed at the baking temperature of about 140° F.; and the elimination of all possible jamming of lids to pans.

This invention has been described by means of an illustration but it is not to be limited to this illustration.

I claim:

1. A baking apparatus for baking in baking pans under a constant weight pressure on said pans comprising an oven having a longitudinal chamber with an inlet and an outlet opening; a continuously moving hearth conveyor moving into, through and out of the oven chamber through said respective openings; baking pans having gravity held lids thereon; and a hold down conveyor disposed within the oven and adapted to gravity engage the lids of said pans whereby the lids on said pans are held onto the pans with uniform pressure while traveling under baking conditions within said oven.

2. The apparatus of claim 1 wherein the hold down conveyor is about one-fifth of the length of said oven.

3. The apparatus of claim 2 wherein the hold down conveyor is of screen mesh construction.

4. The apparatus of claim 3 wherein the hearth conveyor is of flat bed multi-slat construction, each slat having chain rollers on each end traveling in a respective track.

5. The apparatus of claim 4 and means for driving the hold-down conveyor from the driven hearth conveyor.

6. The apparatus of claim 5 wherein the rectangular baking pans have rectangular overlapping lids gravity retained on said pans.

References Cited

FOREIGN PATENTS 212,799  2/1958  Australia.
231,389  12/1960  Australia.

WALTER A. SCHEEL, *Primary Examiner.*

J. SHEA, *Assistant Examiner.*